(12) United States Patent
Terry et al.

(10) Patent No.: US 8,860,370 B2
(45) Date of Patent: Oct. 14, 2014

(54) SYSTEMS AND METHODS OF DYNAMIC CURRENT LIMIT

(75) Inventors: Stephen Christopher Terry, Knoxville, TN (US); Ralph Douglass Smith, Oak Ridge, TN (US); Anthony Gene Antonacci, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 400 days.

(21) Appl. No.: 13/418,307

(22) Filed: Mar. 12, 2012

(65) Prior Publication Data

US 2012/0242311 A1    Sep. 27, 2012

Related U.S. Application Data

(60) Provisional application No. 61/467,734, filed on Mar. 25, 2011.

(51) Int. Cl.
*H02J 7/00* (2006.01)
*H02J 17/00* (2006.01)

(52) U.S. Cl.
CPC ............... *H02J 7/0052* (2013.01); *H02J 17/00* (2013.01)
USPC .......................................... 320/114; 323/299

(58) Field of Classification Search
USPC ......... 320/114, 116, 118, 128, 135, 137, 160, 320/164; 323/299, 235, 237; 700/17, 169, 700/284, 292; 307/64, 104
See application file for complete search history.

(56) References Cited

U.S. PATENT DOCUMENTS

| | | | |
|---|---|---|---|
| 6,184,660 B1 * | 2/2001 | Hatular | 320/141 |
| 6,784,702 B1 * | 8/2004 | Chen | 327/110 |
| 6,947,272 B2 * | 9/2005 | Daniels et al. | 361/93.9 |
| 6,992,452 B1 * | 1/2006 | Sachs et al. | 318/434 |
| 7,206,669 B2 * | 4/2007 | Christiansen | 700/284 |
| 8,410,764 B2 * | 4/2013 | Scaldaferri et al. | 323/282 |

OTHER PUBLICATIONS

U.S. Appl. No. 12/838,298, filed Jul. 16, 2010.

* cited by examiner

*Primary Examiner* — Rajnikant Patel
(74) *Attorney, Agent, or Firm* — William B. Kempler; Frederick J. Telecky, Jr.

(57) ABSTRACT

Systems and methods of dynamic current limit are disclosed herein. A current is sensed a wireless charging circuit, for example. When the current sense reaches a reference current level while a communication is active, the current limit is enabled for the next packet. The current limit signal may be cleared for the next packet.

20 Claims, 5 Drawing Sheets

SYSTEMS AND METHODS OF DYNAMIC CURRENT LIMIT

CROSS-REFERENCE TO RELATED APPLICATION

This application claims benefit to U.S. provisional patent application Ser. No. 61/467,734, filed on Mar. 25, 2011, which is incorporated by reference herein.

TECHNICAL FIELD

The present disclosure is generally related to electronics and, more particularly, is related to power electronics.

BACKGROUND

Inductive coupling, often called magnetic coupling, couples magnetic energy from one coil to another coil. Inductive coupling may be used in transformers to change a voltage on a primary coil (also called a winding) to a higher or lower voltage on a secondary coil. For example, high voltage power lines use transformers to step down high voltages on power lines to lower voltages (e.g. 120 volts) that may be used in homes.

The transfer of energy can be more efficient if a magnetic medium such as iron is used. However, energy may be transferred through a medium such as air from one coil to another coil. Because inductive coupling does not need an electrical conductor to transfer energy from one coil to another coil, batteries in electronic devices may be charged without requiring an electrical cord to be attached to the electronic device. For example, many electric toothbrushes use inductive coupling to recharge batteries in the electrical toothbrushes. These electric toothbrushes are charged by simply placing them on a stand that contains a source of magnetic energy.

Inductive coupling may be used to transfer electrical power as in the case where high voltage transformers transfer power form high voltage power lines to homes. In addition to transferring power, inductive coupling may be used for communication. For example, a transformer may be used to transfer an analog signal such as an audio signal from an amplifier to a loudspeaker in order produce sound. In addition, digital signals may be transmitted from one coil to another coil in order to facilitate communication.

Inductive coupling may be used to transfer power and transmit information concurrently. For example, backscatter modulation is a method of communicating in an inductively coupled system where power is transferred from the power transmitter and data is communicated from the power receiver back to the power transmitter. When inductive coupling is used to transfer power and transmit information concurrently, the transfer of power may corrupt the transmission of information. For example, in a system using backscatter modulation, the charging of a battery can create digital pulses that are transmitted from a receiver to the transmitter corrupting data that is communicated from the receiver to the transmitter. There are heretofore unaddressed needs with previous solutions.

SUMMARY

Example embodiments of the present disclosure provide systems of dynamic current limit. Briefly described, in architecture, one example embodiment of the system, among others, can be implemented as follows: a current sense module configured to sense input current; a control module configured to indicate an active communication; and a current limit module configured to limit an output current when a communication is active and when the input current exceeds a predetermined level.

Embodiments of the present disclosure can also be viewed as providing methods for dynamic current limit. In this regard, one embodiment of such a method, among others, can be broadly summarized by the following steps: monitoring a receiver output current; monitoring for a load pulse; determine if a load pulse occurs at or above a predetermined input current level; and enable current limit for a subsequent data packet if the load pulse occurs at or above the predetermined output current level.

DETAILED DESCRIPTION

Figure 1:
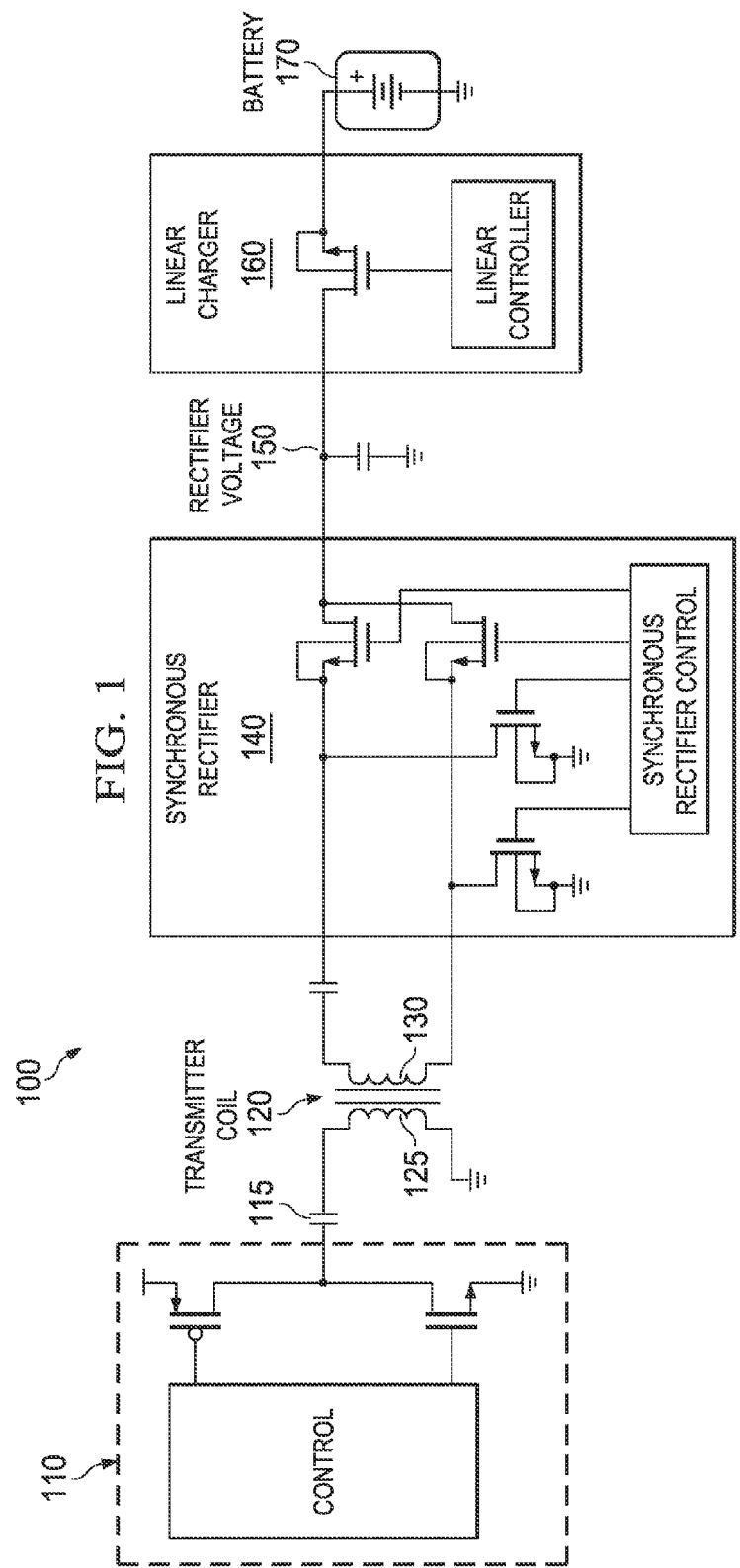
FIG. 1 is a circuit diagram of a wireless power system.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

In some applications, a receiver's output voltage may crash at power-up before the battery in the mobile phone, for example, has been connected. The systems and methods of dynamic current limit prevent these output voltage power-up crashes. A typical architecture for a wireless power receiver is a receiver coil, a rectifier, and a regulation stage followed by a load, which is typically a mobile device such as a cell phone. A problem with wireless power systems using backscatter modulation Is that load pulses from the mobile device load can corrupt wireless power communication. A typical load that can corrupt wireless power communication is a GSM pulse from a cell phone during a call. The GSM pulse may have an amplitude of up to 2 A with a period of about 5 ms with a 10% duty cycle.

In some operating modes, the battery in a mobile device will not be connected and cannot supplement the system load. An example of this case is power-up when the battery is in pre-charge mode. In this case, if the receiver current limits when the battery is not connected, then the system voltage may crash during the current limit period, causing the phone not to work.

The systems and methods of dynamic current limit disclosed herein take advantage of the fact that the most important load transient to protect against from the mobile device is the GSM pulse. However, this will only be present when the battery is connected. Therefore, it is always safe to current limit to filter out a GSM pulse, but it may not be safe to current limit in other cases. The systems and methods disclosed herein detect when GSM load pulses are occurring and current limit in these cases only.

While operating, if the load current exceeds a user defined threshold for a time period, for example 200 us, then it may be assumed that GSM load pulses are occurring, and the current limit may be enabled for the communication packet. Otherwise, the current limit may be disabled.

In an example embodiment of the disclosed systems and methods of dynamic current limit, a charging or regulation circuit is placed between the receiver coil and the load in a wireless power design application. The power input to the charging/regulation circuit may be the rectified receiver coil voltage and the power output from the charging/regulation circuit may be connected to a battery or a charging stage. When the load is a battery, the wireless system may be considered to be a direct battery charger. When the load is a battery charger, the wireless system may be considered a power supply.

Current limiting may be used for battery chargers which are in taper (i.e., the charge current is below the fast charge limit) or current limited power supplies which are in voltage regulation. There are at least two methods which will protect against load current pulses as described in U.S. patent application Ser. No. 12/838,298, filed Jul. 16, 2010, which is wholly incorporated by reference. In a first method, as the battery charge current begins to taper the charging/regulation circuit measures the battery current and sets the current regulation threshold just below the present value of charge current. This forces the charging/regulation circuit to always operate in current limit, so that when a load pulse is pulled from the battery, the charger is current limited and the charging current does not change. This causes the coil current to remain constant and the load pulse not to be seen by the power transmitter. This method could also be applied to power supplies, especially to power supplies that are expected to operate in current limit for fast charge of a battery. In this case the power supply voltage operates at the battery voltage, or an IR drop above the battery voltage if a current sensing resistor is used.

In a second method, when the charge current begins to taper, the charging regulation circuit measures the battery current and sets the current regulation threshold just above the present value of charge current. In this method, when a load pulse is pulled from the battery, the charge current increases a small amount (i.e., the difference between the present value of charge current and the tracking current limit) and does not corrupt communication. Since the charging current changes a small amount (typically less than 100 mA), there is not enough coil current change to be reflected to the power transmitter.

This method could also be applied to power supplies, especially to power supplies that are expected to operate in current limit for battery fast charge operation. In this case, when the charge current has tapered below the fast charge limit, the power supply voltage is at a fixed level (e.g., 5 V). Since the current limit is set above the present value of charge current, the wireless system still acts as a standard power supply for DC loads. However, when a load pulse occurs, the power supply current limits and does not allow the load pulse to be reflected to the primary. The first method may be more applicable for direct charge applications, and the second method may be more applicable for current limited power supply applications. However, both methods could be applied to either application.

Typically, a 200-mA current pulse is used for communication (for example, in a GSM application). So, as long as the charger current increases less than 100 mA during a load pulse, communication won't be corrupted. However, the charge current will only be increased during a period in which receiver to transmitter communication is not taking place. When the charge current is below 200 mA, the current limit no longer tracks the charge current, and instead is fixed at 200 mA. There are two reasons for this. First, since the communication pulse is 200 mA, charge current pulses below 200 mA shouldn't corrupt communication. Second, if the wireless system current limits below this level, it could cause downstream systems to shutdown based on an Under Voltage/Under Current limit.

In example embodiments of disclosed systems and methods of dynamic current limit, the output current of the receiver is limited. The transient load from the battery is determined (the receiver current is ignored so there is no feedback to the transmitter). The current from the receiver is limited, so that all the current comes from the battery and not from the receiver. Even though the same current pulse is reflected on the battery, the pulse fails to be reflected on the primary because the receiver limits the current. The transient load is not changed. Therefore, clean data is reflected through to the primary.

There are multiple ways to improve communication reliability. The current may be limited to a fixed value (for example, always limited to 200 milliamps). In this manner, any noise from the receiver load is blocked. Another method involves tracking the present value of the output current. If the supply current is 500 milliamps and a communication is attempted, the current may be limited to 500 milliamps. Anything additional above 500 milliamps from the load will not be seen by the transmitter because the current has been limited to 500 milliamps.

Once the system is powered up, and once the battery has reached a safe operating voltage (for example, 3.5 volts), the battery would be connected to the system. In that case, transients that occur at power up typically won't cause a problem because they're not periodic. In an example application, it may be acceptable to miss one packet due to the transient. However, if the transient is periodic, such as a GSM pulse from the phone every 5 milliseconds, then every packet may be missed causing communication failure. If a transient occurs due to power up or some other non-periodic situation, the transient may be ignored by the current limit and the full current may be delivered to the system. However, if the device is in charge mode, and a periodic pulse, such as a GSM pulse, is detected, then the current is limited to protect the communication channel.

In example embodiments of the disclosed systems and methods of dynamic current limiting, the GSM power pulse is detected. If the receiver reaches a maximum current level for more than a particular time period, such as 200 microseconds, during the period between two communication packets, current limit is enabled. Otherwise the current limit is disabled. If current limit is enabled during power up, a voltage drop occurs due to the current transient, and a reset results in a typical situation. However, if the current is not limited during power up, the device operates as expected.

FIG. 1 provides typical wireless charging circuit 100. Power supply 110 provides power through capacitor 115 on primary side 125 of transmitter coil 120. The power is inductively coupled to secondary side 130 of transmitter coil 120 where it is regulated by synchronous rectifier 140 to produce rectifier voltage 150. Rectifier voltage 150 is used to charge battery 170 through linear charger 160.

Figure 2:
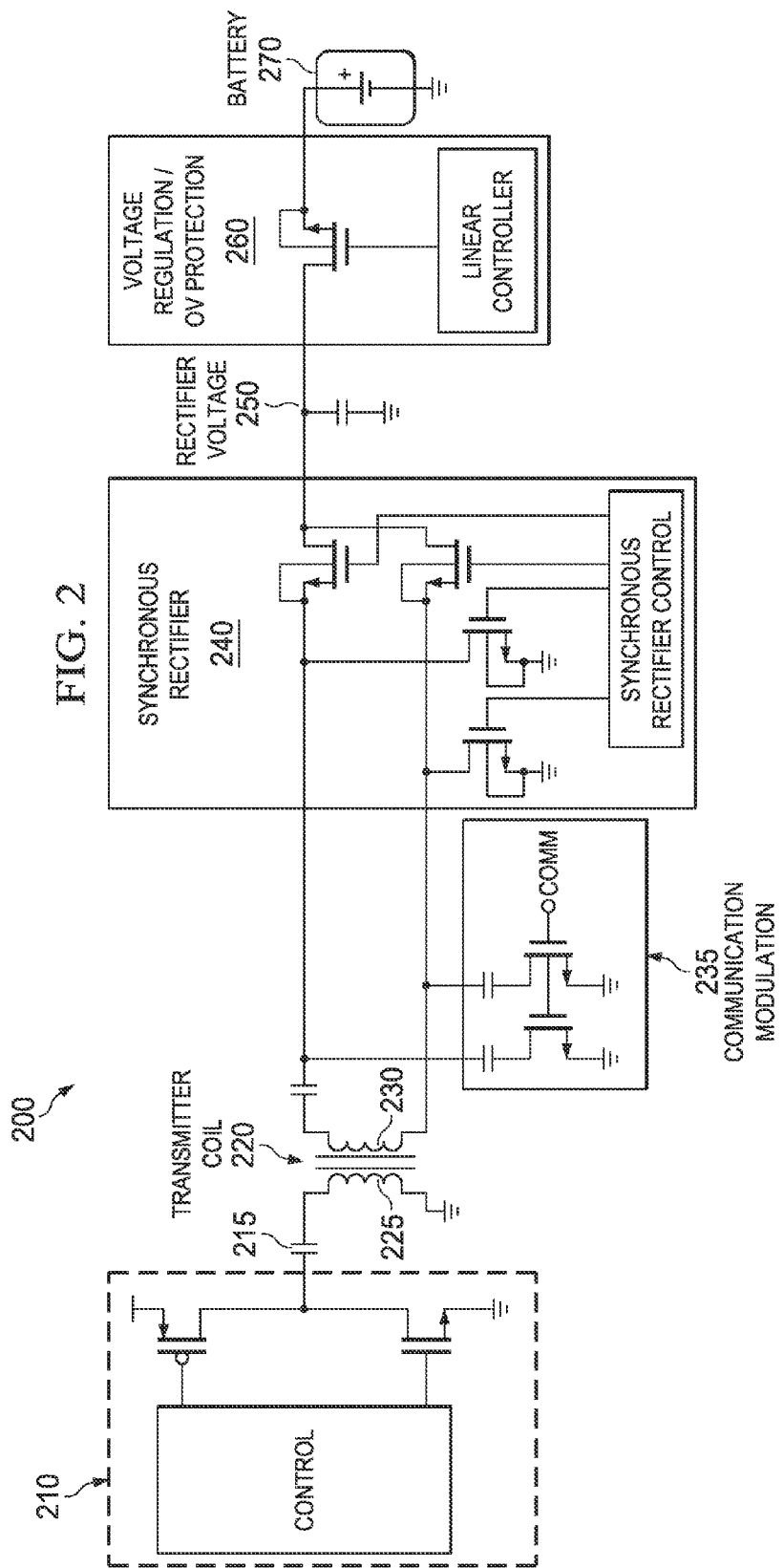
FIG. 2 is a circuit diagram of an example embodiment of the wireless power system of FIG. 1 with communication modulation functionality.

FIG. 2 provides example embodiment of wireless charging circuit 200 with communication capability from the secondary side to the primary side and current limiting capability through the disclosed systems and methods of dynamic current limiting. Power supply 210 provides power through capacitor 215 on primary side 225 of transmitter coil 220. The power is inductively coupled to secondary side 230 of transmitter coil 220 where it is regulated by synchronous rectifier 240 to produce rectifier voltage 250. Rectifier voltage 250 is used to charge battery 270 through linear charger/current limiter 260. Although a linear controller is shown, any type of voltage regulation is intended to be covered by this disclosure. Communication modulation module 235 sends a modulated signal through the inductive coupling of transmitter coil 220 to a primary side controller in power supply 210, for example, to regulate the output of power supply 210.

Figure 3:
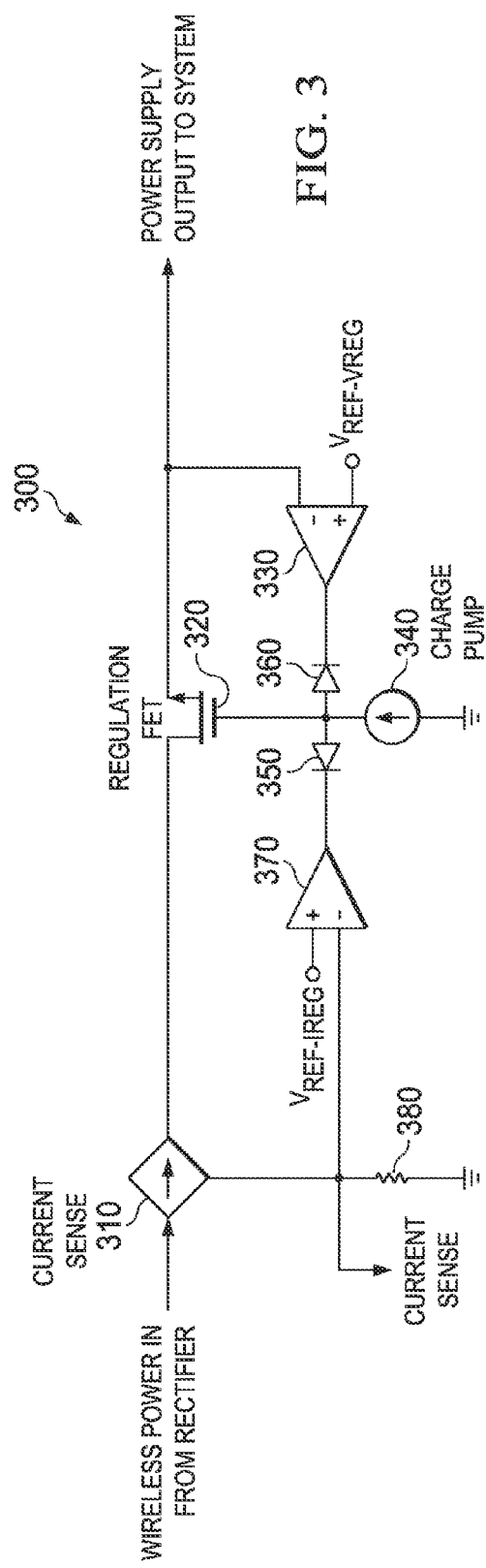
FIG. 3 is a circuit diagram of an example embodiment of the voltage regulation of a system of dynamic current limit.

FIG. 3 provides circuit diagram 300 of a basic wireless charger circuit that may be used in the disclosed systems and methods of dynamic current limiting. In this example embodiment, pass FET 320 acts as a low dropout regulator. And current source 340 acts as a charge pump. Charge pump 340 acts as a current source to drive the gate voltage of FET 320 up to approximately 12V in case either loop is in regulation. The charge pump function for this LDO architecture is used because we the gate of the NMOS pass FET must run above the output voltage by approximately 2V. In many cases, it must also run above the input voltage. Regulation amplifier 330 compares the output voltage to a regulation threshold voltage. If the output voltage exceeds the regulation threshold voltage, the output of amplifier 330 starts sinking current and diode 360 turns on, which pulls the gate of FET 320 down to regulate the output voltage. When FET 320 is regulating the output voltage, diode 350 turns off. As the output reaches the current limit level, the current is controlled with amplifier 370. The current is sensed at current sense module 310, which is reflected in the voltage on the inverting input of amplifier 370. $V_{REF-IREG}$ on amplifier 370 is related to the current sense, $I_{REF}$, from FIG. 4. $V_{REF-IREG}$ is 100% at full current; however, if the voltage at the inverting input reaches $V_{REF-IREG}$, then current is regulated with FET 320. $I_{REF}$ in FIG. 4 is typically around 90% of full current, in an example embodiment.

The current sense input is a voltage that is proportional by some scaling to what the output current is. In an example implementation, one volt equals one amp, or one volt at the inverting input of amplifier 370 is one amp through regulation FET 320. FIG. 4 provides circuit 400 for providing the current limit signal. If the inverting input of amplifier 370 of FIG. 3 rises to one volt, then the current sense voltage on the non-inverting input of comparator 450 of FIG. 4 rises to one volt. When the non-inverting input of comparator 450 rises above $I_{REF}$ at the inverting input comparator 450, the output of comparator 450 goes high.

In an example embodiment, deglitch function 440 eliminates noise that may be on the system to approximate a true current sense situation. The output of deglitch 440 clocks D flip flop 430. When D flip flop 430 is clocked by the output of 440, D flip flop 430 sends a high signal to AND gate 420. If the output of the D flip flop is high, the communication is indicated as active from control unit 410, then both inputs of AND gate 420 are high, so the output of AND gate 420 is high and the communication limit is enabled. Once the communication is complete, D flip flop 430 is cleared with the $I_{lim}$ clear signal from control unit 410. If, at any time between any two packets the output current is sensed above $I_{REF}$, then D flip flop 430 is clocked and latched to enable the current limit for the next packet. The current limit is disabled after the packet is sent and the latch is cleared.

Figure 4:
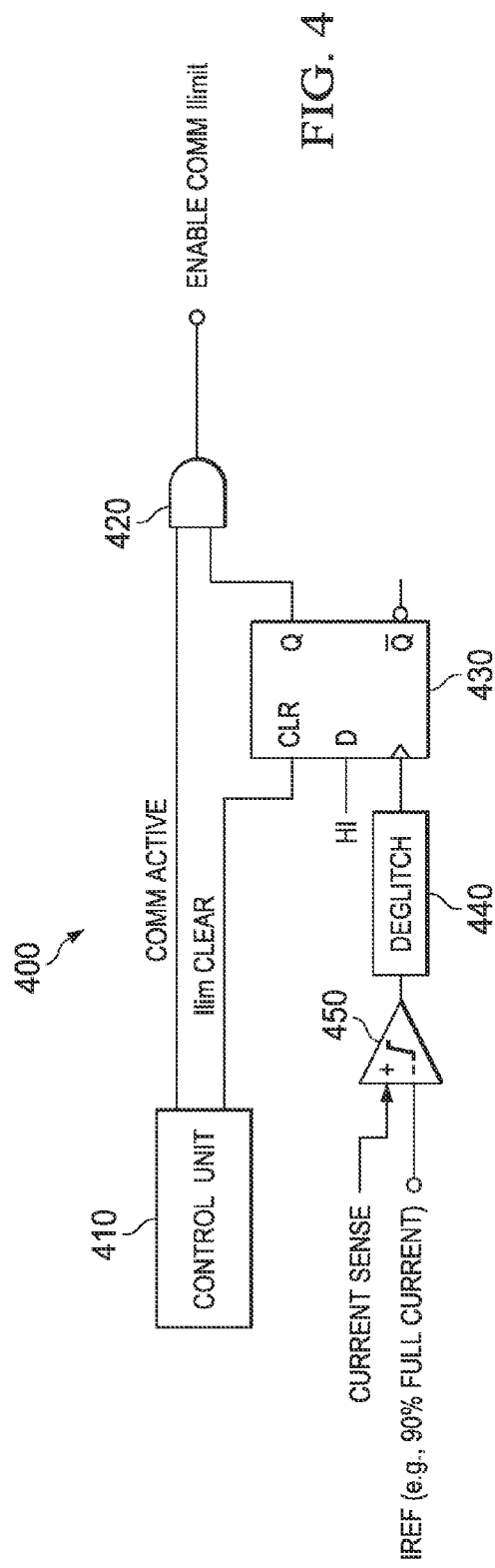
FIG. 4 is a circuit diagram of an example embodiment of the current limit function of a system of dynamic current limit.
Figure 5:
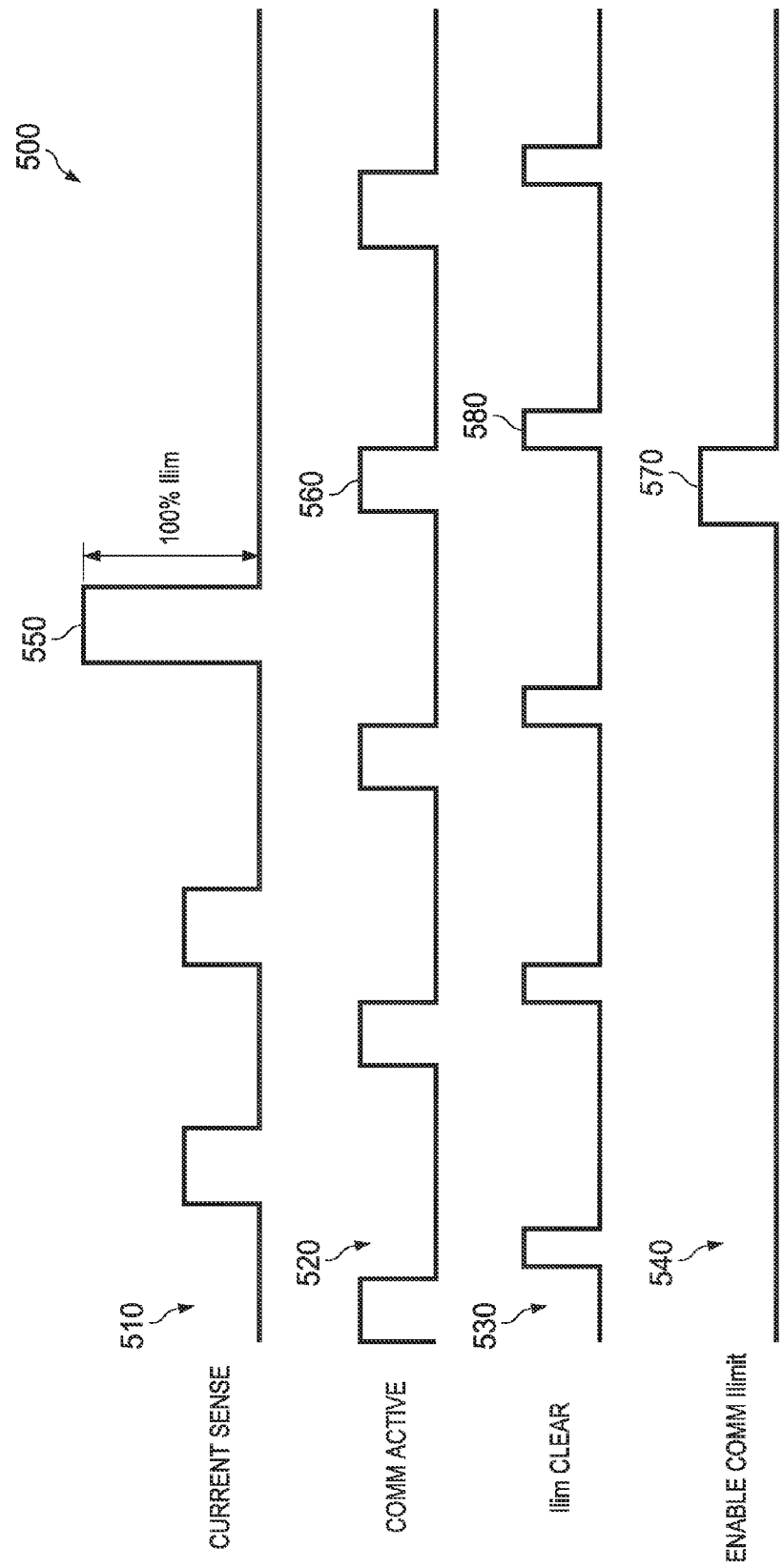
FIG. 5 is a signal diagram of an example embodiment of the system of FIG. 4.

FIG. 5 provides graph 500 of various signals of the example embodiments of FIG. 3 and FIG. 4. In an example embodiment, pulses 550 in CURRENT SENSE signal 510 are the load current pulses. In a typical cell phone, the current used for communication is not a DC current. The amplifier transmitting the data may only transmit during particular pulse periods. The amplifier does not communicate constantly. The smaller pulses may represent functions such as a back light, for example. The larger pulse may be indicative of a phone call. COMM ACTIVE signal 520 is high when the wireless power system is communicating. $I_{lim}$ CLEAR signal 530 is high after the communication is complete to clear the latch.

In the example embodiment of FIG. 5, small pulses are first sensed on CURRENT SENSE signal 510 so ENABLE COMM limit signal 540 is low. When large pulse 550 is sensed, the current limit is enabled by pulse 570 on ENABLE COMM limit signal 540. The communication limit is enabled by pulse 570 for the next communication packet (pulse 560) and then it is cleared by pulse 580.

Figure 6:
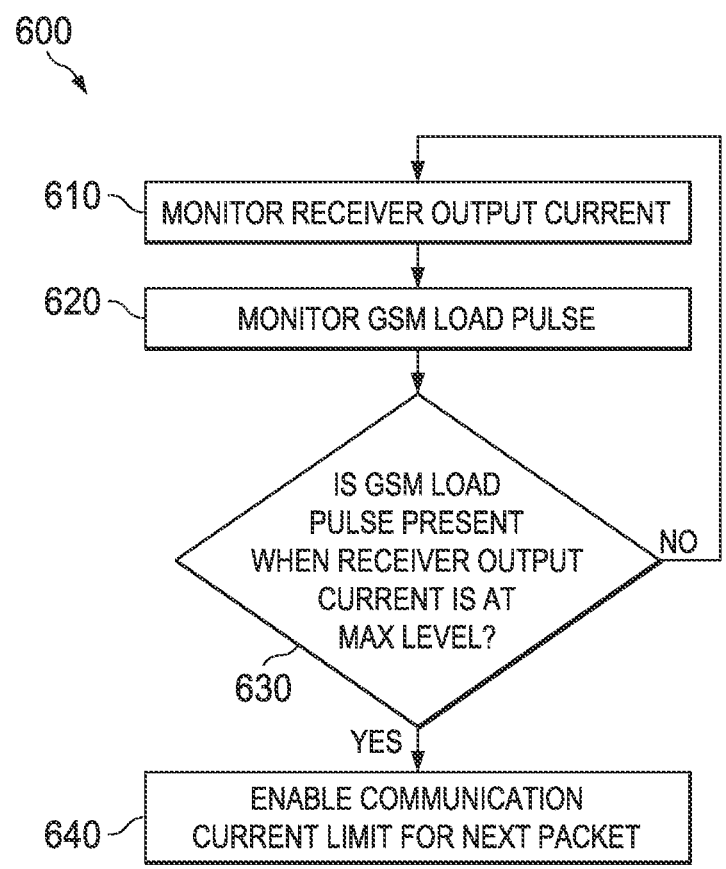
FIG. 6 is a flowchart of an example embodiment of a method of dynamic current limit.

FIG. 6 provides method 600 of dynamic current limiting. In block 610 a receiver output current is monitored. In block 620 a communication line is monitored. In block 630, if a GSM load pulse is present when the receiver output current is above a predetermined level, then in block 640, a communication current limit is enabled for the next packet. If a GSM load pulse is not present, then the monitoring continues in block 610.

Although the present disclosure has been described in detail, it should be understood that various changes, substitutions and alterations can be made thereto without departing from the spirit and scope of the disclosure as defined by the appended claims.

Therefore, at least the following is claimed:

1. A method comprising:
monitoring a receiver output current;
monitoring for a load pulse;
determine if a load pulse occurs at or above a predetermined input current level; and
enable current limit for a subsequent data packet if the load pulse occurs at the predetermined output current level.

2. The method of claim 1, wherein the load pulse is a Global System of Mobile Communications (GSM) load pulse.

3. The method of claim 1, wherein the receiver is configured to operate at the current limit level as a steady state condition.

4. The method of claim 1, further comprising disabling the current limit when a battery is not connected.

5. The method of claim 1, wherein the current limit occurs on a secondary side of a wireless power system.

6. The method of claim 5, further comprising communicating from the secondary side to a primary side of the wireless power system by load modulation.

7. The method of claim 1, wherein the predetermined output current limit is user defined.

8. A system comprising:
a current sense module configured to sense input current;
a control module configured to indicate an active communication; and
a current limit module configured to limit an output current when a communication is active and when the input current exceeds a predetermined level.

9. The system of claim 8, wherein the active communication comprises a Global System of Mobile Communication (GSM) load pulse.

10. The system of claim 8, further comprising a primary coil and a secondary coil, wherein the input current sensed by the current sense module is on the secondary coil and is a reflection of the current on the primary coil.

11. The system of claim 8, wherein the current limit module is disabled when a battery is not connected.

12. The system of claim 8, wherein the predetermined level is user defined.

13. The system of claim 8, further comprising a deglitch circuit to filter false current spikes.

14. The system of claim 8, wherein the control module is further configured to clear the current limit condition when the input current falls below the predetermined level.

15. A system, comprising:
- a current sense resistor configured to sense an input current;
- a comparator configured to set when the input current exceeds a reference current;
- a flip flop configured to set when the comparator sets; and
- a logic gate configured to enable a current limit when the flip flop is set and when an active communication signal is received.

16. The system of claim 15, further comprising a deglitch module configured to deglitch the output of the comparator.

17. The system of claim 15, further comprising a control circuit configured to clear the flip flop when no communication is active.

18. The system of claim 15, further comprising a secondary side coil configured to receive the input current from a primary side coil.

19. The system of claim 15, wherein the active communication signal indicates an active Global System of Mobile Communication (GSM) communication.

20. The system of claim 15, further comprising a synchronous rectifier configured to be current limited by the output of the logic gate.

* * * * *